(12) United States Patent
Johnson et al.

(10) Patent No.: US 8,413,642 B2
(45) Date of Patent: Apr. 9, 2013

(54) GENSET THAT USES AN OPEN LOOP ELECTRONIC FUEL INJECTION SYSTEM AND OPERATES ON GASEOUS FUELS

(75) Inventors: Aaron C. Johnson, Champlin, MN (US); Keith M. Schorr, Summerville, SC (US); Timothy J. Krattenmaker, Blaine, MN (US)

(73) Assignee: Cummins Power Generation, Inc., Minneapolis, MN (US)

( * ) Notice: Subject to any disclaimer, the term of this patent is extended or adjusted under 35 U.S.C. 154(b) by 408 days.

(21) Appl. No.: 12/695,433

(22) Filed: Jan. 28, 2010

(65) Prior Publication Data
US 2011/0180042 A1    Jul. 28, 2011

(51) Int. Cl.
*F02B 43/00* (2006.01)
(52) U.S. Cl. ............... 123/527; 123/27 GE; 123/478
(58) Field of Classification Search .............. 123/27 GE, 123/478, 527
See application file for complete search history.

(56) References Cited

U.S. PATENT DOCUMENTS

| | | | | |
|---|---|---|---|---|
| 5,787,864 | A * | 8/1998 | Collier et al. | 123/492 |
| 6,289,877 | B1 * | 9/2001 | Weisbrod et al. | 123/480 |
| 6,289,881 | B1 * | 9/2001 | Klopp | 123/525 |
| 7,131,431 | B1 * | 11/2006 | Guglielmo et al. | 123/527 |
| RE40,431 | E * | 7/2008 | Robitschko et al. | 123/674 |
| 8,005,603 | B2 * | 8/2011 | Fisher et al. | 701/103 |

* cited by examiner

*Primary Examiner* — Erick Solis
(74) *Attorney, Agent, or Firm* — Hamre, Schumann, Mueller & Larson, P.C.

(57) ABSTRACT

A genset engine that operates on an open loop EFI system and runs on gaseous fuels is described. The integration of various air sensors, including for example a manifold air temperature (MAT) sensor, a manifold absolute pressure (MAP) sensor, or an air flow sensor(s), can provide optimal engine performance when using gaseous fuels and when starting from a cold state. The sensors employed send data to the electronic control unit (ECU) and such data is used to determine the optimal air-to-fuel ratio (AFR). The ECU actuates the injector and the injector sends the requested amount of gaseous fuel to mix with the air flow to be combusted. This provides the engine with a gaseous fuel and air mixture that is at the requested relative AFR and the engine is able to start and meet performance.

17 Claims, 8 Drawing Sheets

GENSET THAT USES AN OPEN LOOP ELECTRONIC FUEL INJECTION SYSTEM AND OPERATES ON GASEOUS FUELS

FIELD

This disclosure relates to a genset engine that uses open loop electronic fuel injection (EFI) systems and is able to operate on gaseous fuels. Engine sensors, including for example one or more air sensors, such as an air flow sensor, a manifold air temperature (MAT) sensor and a manifold absolute pressure (MAP) sensor, send signals to an electronic control unit (ECU) which in turn controls the air/fuel mixture to reach an operative air-to-fuel ratio (AFR) resulting in improved and efficient engine performance.

BACKGROUND

Genset engines that run on liquefied petroleum gas (LPG) in a carbureted fuel system are known. Genset engines that operate with open loop EFI systems are known to run on gasoline or ethanol but are not known to run on LPG or any gaseous fuel. Therefore, it is not known to run a genset engine integrating an open loop EFI with gaseous fuels.

Fuel injection systems mix fuel with air in internal combustion engines. Fuel is forcibly pumped through an injector and the fuel is then mixed with air and is either indirectly or directly placed in the combustion chamber. The air-to-fuel ratio (AFR) must be precisely controlled to achieve desired engine performance, emissions, and fuel economy. Fuel injection systems react to changing inputs, where the data is provided by various sensors, by controlling the amount of fuel injected.

A known open loop electronic fuel injection (EFI) system uses gasoline or ethanol as its fuel, but not gaseous fuels, e.g. liquefied propane gas. Such known open loop EFI systems often include a fuel injector, an electronic control unit (ECU), an air flow sensor, a fuel pump, a fuel pressure regulator, and perhaps other input sensors. Features of the engine system include an exhaust system, an intake system, the engine, and a gas tank. Air flow enters at the intake system and exhaust flow exits at the exhaust system. An air flow sensor senses the mass of air that flows past it and transmits this data to the ECU. The ECU uses this air flow information with the requested air-to-fuel ratio (AFR), which is a value set in the software, which will provide the best engine performance, to determine the fueling needed. The ECU electrically actuates the fuel injector so that fuel mixes with the air flow to reach the AFR determined by the ECU.

Figure 1A:
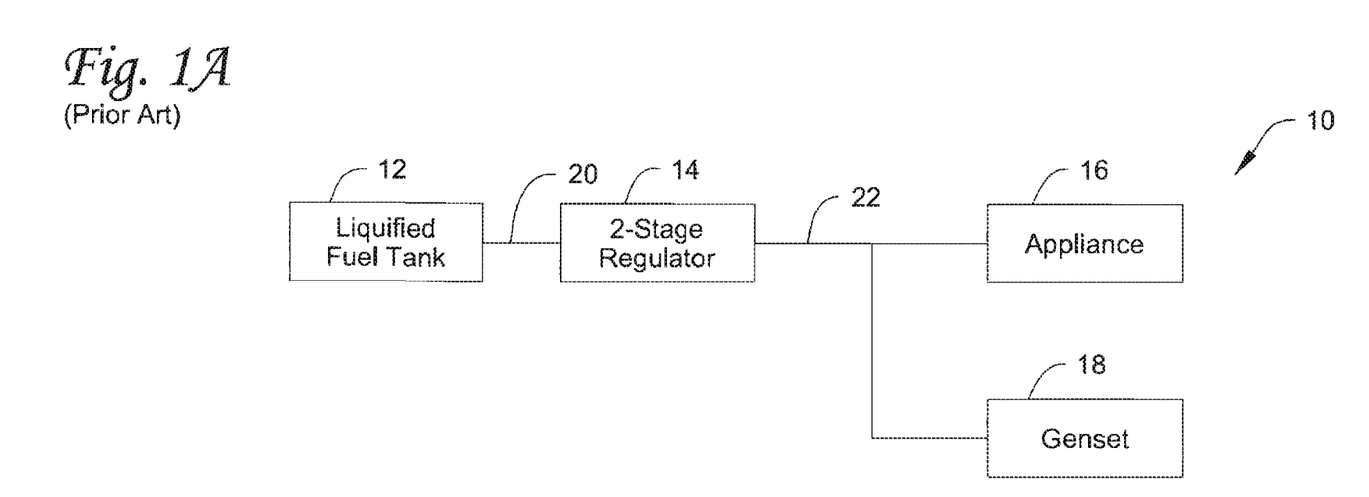
FIG. 1A illustrates a conventional a genset engine using a gaseous fuel system.
Figure 1B:
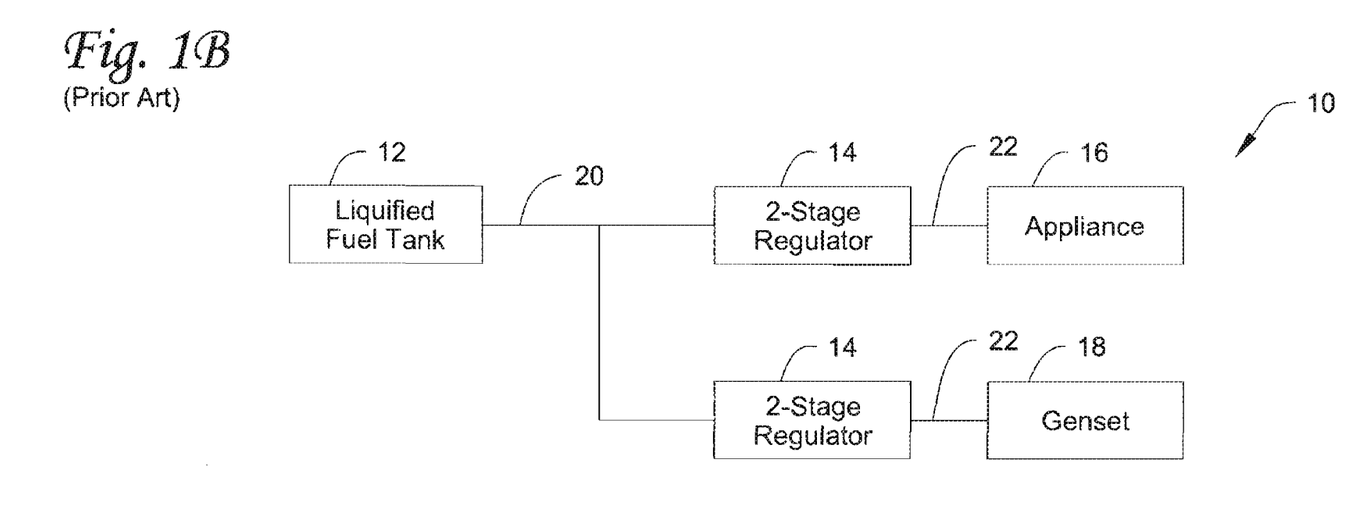
FIG. 1B illustrates a conventional a genset engine using a gaseous fuel system.

FIGS. 1A and 1B show current gaseous fuel systems 10 that use carbureted fuel systems, such as in recreational vehicle settings. The fuel is stored in a liquid state in a tank 12 or in multiple tanks, e.g., a propane tank. The fuel is converted to a vapor as it leaves the tank and the fuel vapor travels from the tank 12 to a 2-stage converter/regulator 14 where the pressure of the fuel vapor is reduced, generally to about 0.4 psi. From the converter/regulator 14, the fuel vapor is provided to the appropriate appliance 16 or genset engine 18 within the recreational vehicle. As shown in FIG. 1A, there can be one converter/regulator 14 for all appliances 16 and the genset engine 18 with fuel lines that tap off of the secondary fuel line 22 to the appliances 16 and the genset engine 18. Or, as shown in FIG. 1B, there can be a separate converter/regulator 14 provided for each appliance 16 and genset engine 18 with fuel lines that tap off of the main fuel line 20 to each converter/regulator 14. In current genset engine systems, the fuel vapor is mixed with air and this air/fuel mixture is fed to a carburetor which supplies the mixture into the genset engine 18 for combustion. The problem with this is that there is no indication that the air/fuel mixture is at the correct AFR ratio to run the genset engine, which has a narrow band of AFR for operation. There is not an inexpensive device at present to accurately account for changes in the air pressure and temperature when dealing with gaseous fuels in genset engines.

Rather, genset engines that run on gasoline, ethanol, and gaseous fuels are known to operate with closed loop EFI systems. For example, genset engines that run on LPG in a carbureted fuel system are known. Engines that operate with open loop EFI systems are known to run on gasoline or ethanol, but are not known to run on liquefied petroleum gas (LPG) or any gaseous fuel. In particular, open loop EFI genset engines that run on gaseous fuels are not known.

SUMMARY

A genset engine that operates on an open loop EFI system and runs on gaseous fuels is described. The EFI system herein is particularly useful for a genset engine, but can be used on any type of internal combustion engine. The integration of one or more air sensors for use in an open loop control can improve engine performance when using gaseous fuels and when starting from a cold state, i.e., starting the engine after not operating for a relatively long period of time. Such air sensors include, for example, an air flow sensor, a manifold air temperature (MAT) sensor and/or a manifold absolute pressure (MAP) sensor.

Such sensors, e.g. air flow, MAT and/or MAP sensors, send data to an electronic control unit (ECU). This data is correlated with data provided by other sensors to determine the optimal air-to-fuel ratio (AFR). Such other sensors may be provided in a lookup table of the ECU and can include, but are not necessarily limited to, oil temperature sensors, coolant temperature sensors, throttle position sensors, and engine speed sensors. The ECU actuates the injector and the injector sends the correct amount of gaseous fuel to mix with the air flow to be combusted. This provides the engine with a gaseous fuel and air mixture that is at a requested relative AFR, so that the engine can start and continue to operate with acceptable performance. A system described herein can be advantageous over those systems employing a mixer and less expensive than those employing closed loop control.

Genset engines are generally known as stand-alone engines that generate power to run electrical devices. A genset engine can be used as a back-up power source in the event of a loss of electrical grid power. In one embodiment, genset engines using gaseous fuel are provided in recreational vehicles to subsidize grid electricity. In another embodiment, genset engines using gaseous fuel are provided in recreational vehicles as the only source of power for the recreational vehicle. In other embodiments, the genset engine using gaseous fuel may be provided as a secondary source of power for a home or business. In yet another embodiment, the genset engine using gaseous fuel may be the primary source of power where grid power is not readily available, such as remote locations or construction sites. It is to be realized that genset engines using gaseous fuel have many uses and are not limited to the uses in the above stated embodiments.

It is known that genset engines have a narrow range of proper AFR for operation. Therefore, if the air/fuel mixture is not properly calibrated, the genset has poor starting and running performance. In order to operate the genset with acceptable performance, gaseous fuel must be provided at a cold start state and during its operation, such that the AFR of fresh charge for combustion remains within a relatively narrow band. Gensets equipped with open loop EFI systems are normally designed and calibrated to run on only a single ethanol/gasoline blend of fuel, and are not known to run on gaseous fuels. In addition, gensets equipped with carbureted fuel systems are designed to run on liquefied petroleum gas (LPG), natural gas (which is mostly methane), methane, ethane, or butane, but the performance is often below the acceptable range due to an incorrect AFR and the inability to maintain the AFR in the narrow band of operation. The actual value of the AFR needed to run the genset is a function of the fuel. Since the AFR's can be considerably different, based on the type of fuel, AFR's are discussed in terms of relative AFR. It is difficult to put a range on requested AFR, since it is a function of several variables including engine design, performance requirements, etc.

In order to run a genset engine with gaseous fuels, the designs herein incorporate air sensors, which can include air flow sensors, manifold air temperature (MAT) sensors and manifold absolute pressure (MAP) sensors, integrated into the open loop EFI system.

In one embodiment, a genset engine operating on gaseous fuels is equipped with an open loop EFI integrated with manifold air temperature (MAT) and manifold absolute pressure (MAP) sensors. In another embodiment, such a genset engine is equipped with an open loop EFI integrated with a manifold air temperature (MAT) sensor and a throttle position sensor. In yet another embodiment, such a genset engine is equipped with an open loop EFI integrated with an air flow sensor that determines air flow on a mass or volumetric basis. In yet another embodiment, such a genset engine is equipped with an open loop EFI integrated with a manifold absolute pressure (MAP) sensor. By using MAT and MAP sensors along with open loop control, the genset is able to attain acceptable performance without the cost and complexity of a closed loop system that uses extra parts such as exhaust sensors or complex algorithms to determine correct AFR when using gaseous fuels.

DETAILED DESCRIPTION

A genset engine that operates on an open loop EFI system and runs on gaseous fuels is described. The EFI system is useful on a genset engine, but may be applicable for any type of internal combustion engine where appropriate. The integration of air sensors in the EFI system, such as air flow sensors, manifold air temperature (MAT) and/or manifold absolute pressure (MAP) sensors, provides improved engine performance and efficiency when using gaseous fuels and when starting from a cold state, i.e., starting the engine after not operating for a long period of time. The air flow, MAT and/or MAP sensors send data to the electronic control unit (ECU) and this data is correlated with data provided by other sensors to determine the optimal or requested relative air-to-fuel ratio (AFR). The ECU actuates a fuel injector and the injector sends the correct amount of gaseous fuel to mix with the air flow to be combusted. This provides the engine with a gaseous fuel and air mixture that is at the requested relative AFR and the engine is able to start and operate efficiently.

Figure 2:
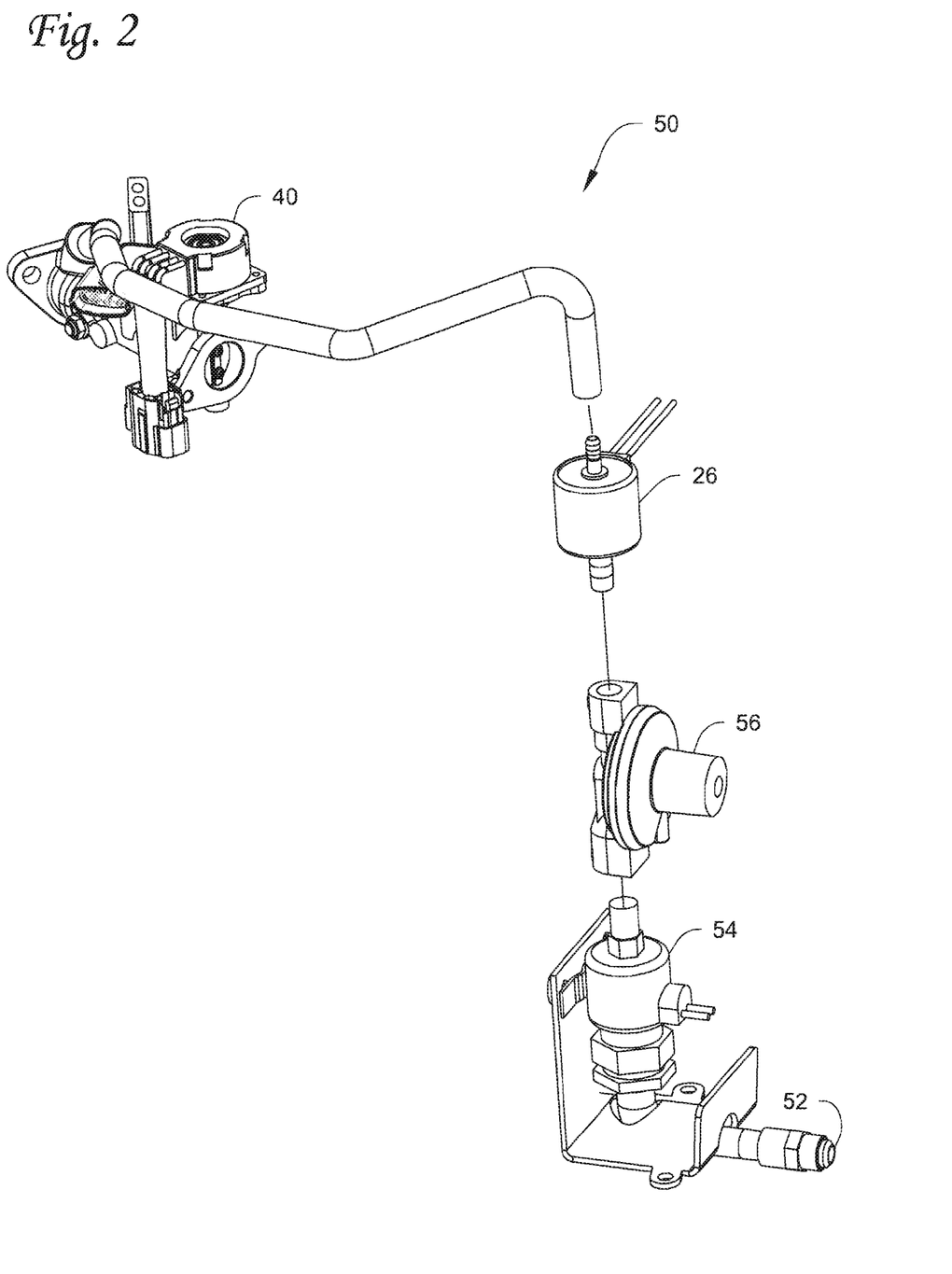
FIG. 2 illustrates one embodiment of a genset engine herein, showing its components, and that operates on an open loop EFI system and runs on gaseous fuels.

An overview of one embodiment of a genset engine 40 integrating an EFI system 50 that operates on gaseous fuels is illustrated in FIG. 2. Fuel, as a vapor, is provided from a tank (not shown), through the tank inlet 52, and is fed to a solenoid 54. The vaporized fuel continues to a regulator 56 which regulates the vaporized fuel to the correct pressure and is fed to a fuel injector 26. The vaporized fuel is provided to the genset engine 40 where it is mixed with air, either in the intake system or in the combustion area, and combusted.

Figure 3:
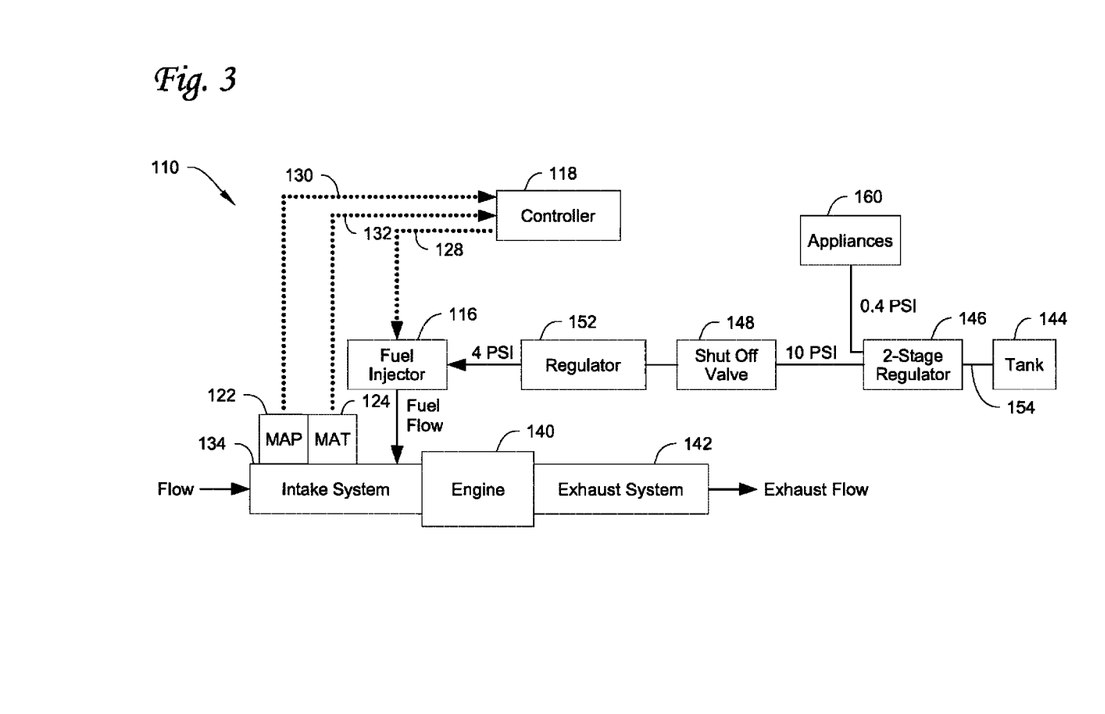
FIG. 3 illustrates a schematic of a genset engine that operates on an open loop EFI system incorporating MAP and MAT sensors and runs on gaseous fuels.

One embodiment of a genset engine integrating an open loop EFI system 110 that operates on gaseous fuels is shown in FIG. 3. As one example, the system 110 can be particularly constructed for use in a recreational vehicle, but may be used in other environments where appropriate. FIG. 3 shows an open loop EFI system including a fuel injector 116, an electronic control unit (ECU) 118, a manifold absolute pressure (MAP) sensor 122, a manifold air temperature (MAT) sensor 124, communication circuitry 128 linking the ECU 118 and the fuel injector 116, communication circuitry 130 linking the ECU 118 and the MAP sensor 122, and communication circuitry 132 linking the ECU 118 and the MAT sensor 124. It is to be realized that in another embodiment, the MAP sensor 122 can be used without the incorporation of the MAT sensor 124.

In the embodiment shown, additional features of the genset engine system include an intake system 134, the engine 140, an exhaust system 142, a fuel tank 144, a shut-off valve 148, and a regulator 152. In some embodiments, fuel vapor moves from the fuel tank 144 to a two-stage regulator 146 via the main fuel line 154. The two-stage regulator 146 acts to reduce the vapor pressure down to, for example 10 psi and 0.4 psi, in a two-stage process. The first stage reduces the pressure, for example to a gaseous pressure such as about 10.0 psi and this is fed to a shut-off valve 148 and then to a second regulator 152 which further reduces the vapor pressure, for example to a gaseous pressure such as about 4.0 psi. The fuel is then provided to the fuel injector 116 and the fuel is injected into the intake system 134. The second stage of the two-stage regulator 146 further reduces the fuel vapor pressure, for example to a gaseous pressure of about 0.4 psi and this vapor is fed to various gaseous fuel consuming appliances 160 and accessories in the recreational vehicle.

Figure 4:
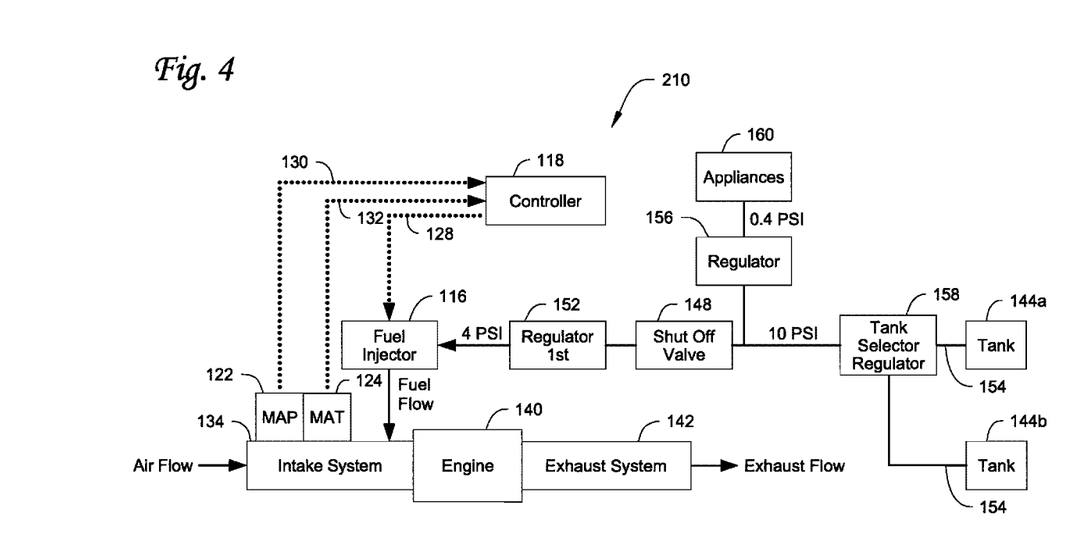
FIG. 4 illustrates a schematic of a genset engine that operates on an open loop EFI system incorporating MAP and MAT sensors and runs on gaseous fuels.

It is to be realized that more than one fuel tank may be provided (see e.g. FIG. 4). Where more than one tank is provided, a tank selector regulator 158 is supplied between the tanks 144a, 144b and such regulator 158 is connected to the tanks 144a, 144b through main fuel lines 154. The tank selector regulator adjusts the pressure of the vaporized fuel, for example to about 10.0 psi. FIG. 4 is described in further detail below.

Figure 3A:
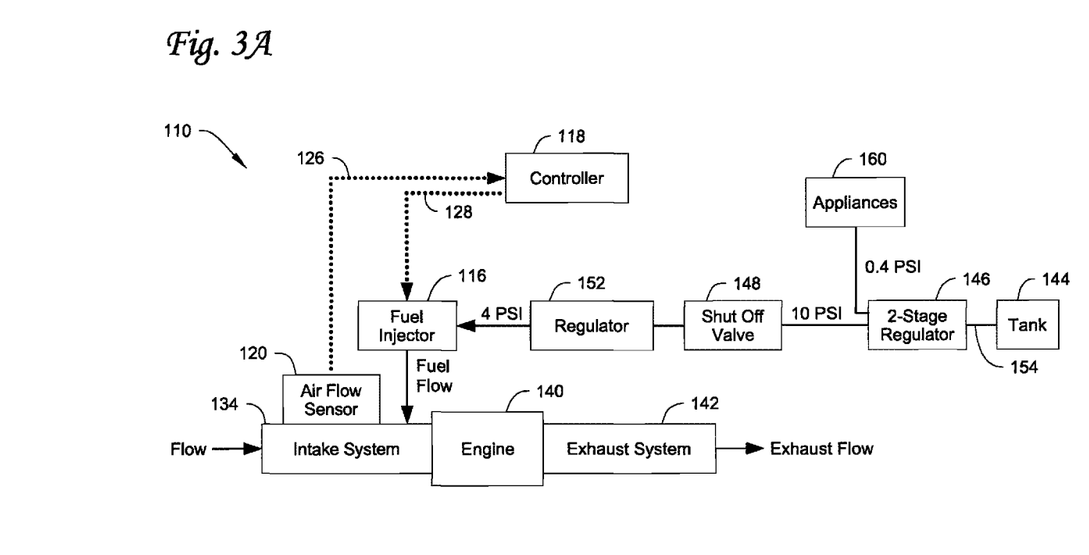
FIG. 3A illustrates a schematic of a genset engine that operates on an open loop EFI system incorporating an air flow sensor and runs on gaseous fuels.

The configuration in which the air sensors and their type are incorporated in a system herein can have many variations. For example, in one embodiment, as shown in FIG. 3A, the open loop EFI system is comprised of a fuel injector 116, an electronic control unit (ECU) 118, an air flow sensor 120, communication circuitry 126 linking the ECU 118 and the air flow sensor 120, and communication circuitry 128 linking the ECU 118 and the fuel injector 116.

Figure 3B:
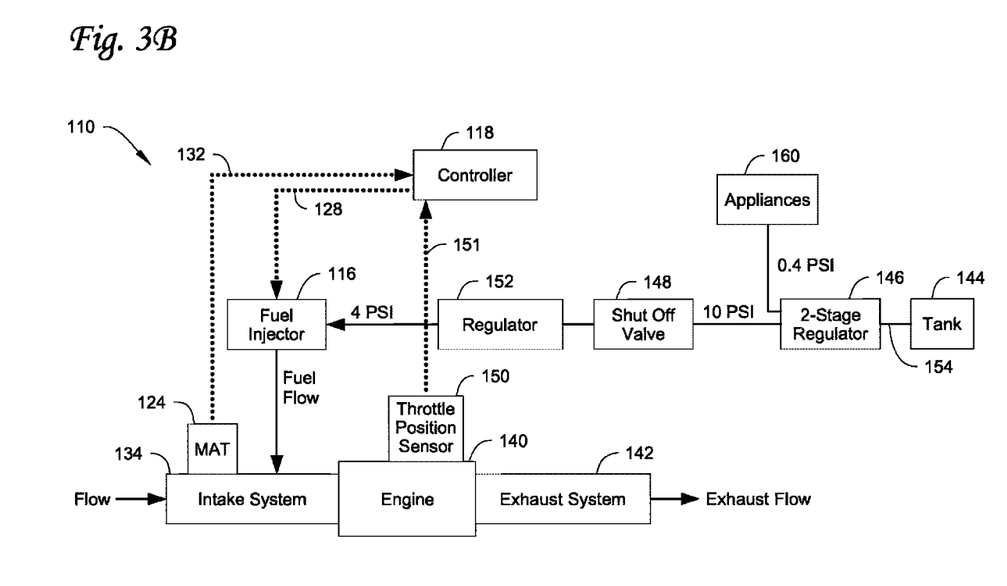
FIG. 3B illustrates a schematic of a genset engine that operates on an open loop EFI system incorporating a MAT sensor and throttle position sensor and runs on gaseous fuels.

In another embodiment, as shown in FIG. 3B, the open loop EFI system is comprised of a fuel injector 116, an electronic control unit (ECU) 118, a manifold air temperature (MAT) sensor 124, a throttle position sensor 150, communication circuitry 128 linking the ECU 118 and the fuel injector 116, communication circuitry 151 linking the ECU 118 and throttle position sensor 150, and communication circuitry 132 linking the ECU 118 and the MAT sensor 124. Like reference numbers in FIGS. 3A and 3B are similar to those previously described.

It will be appreciated that the above embodiments are not all encompassing and there can be other sensors and combinations that may be employed.

FIG. 4 shows another embodiment of a genset engine integrating an open loop EFI system 210 that operates on gaseous fuels. As one example, the system 210 can be particularly constructed for use in a recreational vehicle, but may be used in other environments where appropriate. The open loop EFI system is comprised of a fuel injector 116, an electronic control unit (ECU) 118, a manifold absolute pressure (MAP) sensor 122, a manifold air temperature (MAT) sensor 124, communication circuitry 128 linking the ECU 118 and the fuel injector 116, communication circuitry 130 linking the ECU 118 and the MAP sensor 122, and communication circuitry 132 linking the ECU 118 and the MAT sensor 124. It is to be realized that in another embodiment, the MAP sensor 122 can be used without the incorporation of the MAT sensor 124.

In the embodiment shown, additional features of the genset engine system include an intake system 134, the engine 140, an exhaust system 142, fuel tanks 144a, 144b, a shut-off valve 148, a tank selector and regulator 158, and regulators 152, 156. It is to be realized that more than one fuel tank can be provided. As shown in FIG. 4 two tanks 144a, 144b are used, but it will be appreciated that more than two tanks may be employed. Fuel moves from the fuel tanks 144a, 144b to a tank selector regulator 158 via a main fuel line 154. The tank selector regulator 158 lowers the fuel pressure to a gaseous pressure such as for example about 10.0 psi. The fuel at 10.0 psi can then be sent to the regulator 156 that reduces the pressure to about 0.4 psi and supplies this fuel to various gaseous fuel consuming appliances 160 in the recreational vehicle. Fuel also moves to the engine 140 from the tank selector regulator 158 through a shut-off valve 148 and enters the regulator 152 which further reduces the pressure to a gaseous pressure such as for example about 4.0 psi. The fuel is then provided to the fuel injector 116 which injects the fuel into the intake system 134.

As described with respect to FIG. 3 above, the configuration in which the air sensors and their type are incorporated in a system herein can have many variations. For example, in other embodiments, the open loop EFI system is comprised of the above components with various combinations of an air flow sensor 120, a manifold absolute pressure (MAP) sensor 122, and a manifold air temperature (MAT) sensor 124.

Figure 4A:
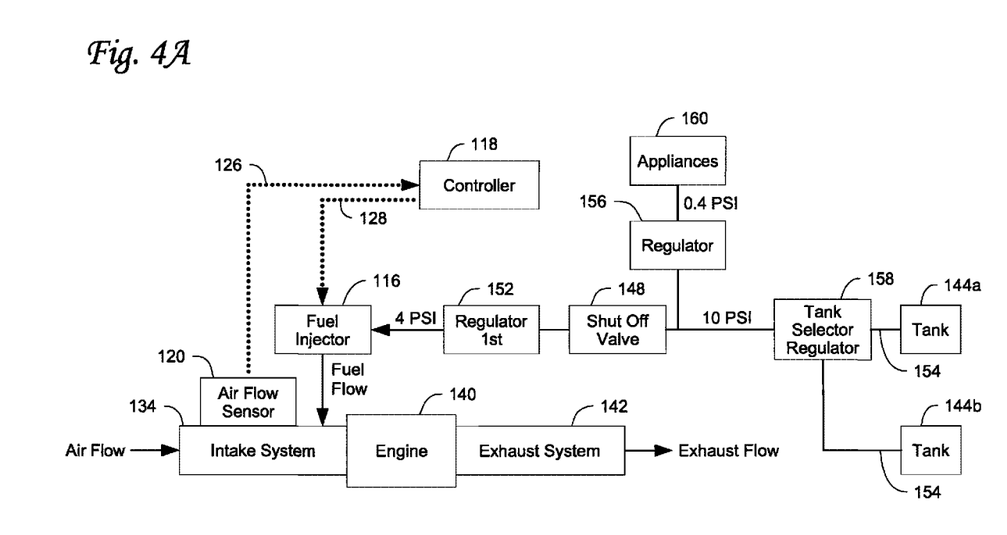
FIG. 4A illustrates a schematic of a genset engine that operates on an open loop EFI system incorporating an air flow sensor and runs on gaseous fuels.

For example, in another embodiment, as shown in FIG. 4A, the open loop EFI system is comprised of a fuel injector 116, an electronic control unit (ECU) 118, an air flow sensor 120, communication circuitry 126 linking the ECU 118 and the air flow sensor 120, and communication circuitry 128 linking the ECU 118 and the fuel injector 116.

Figure 4B:
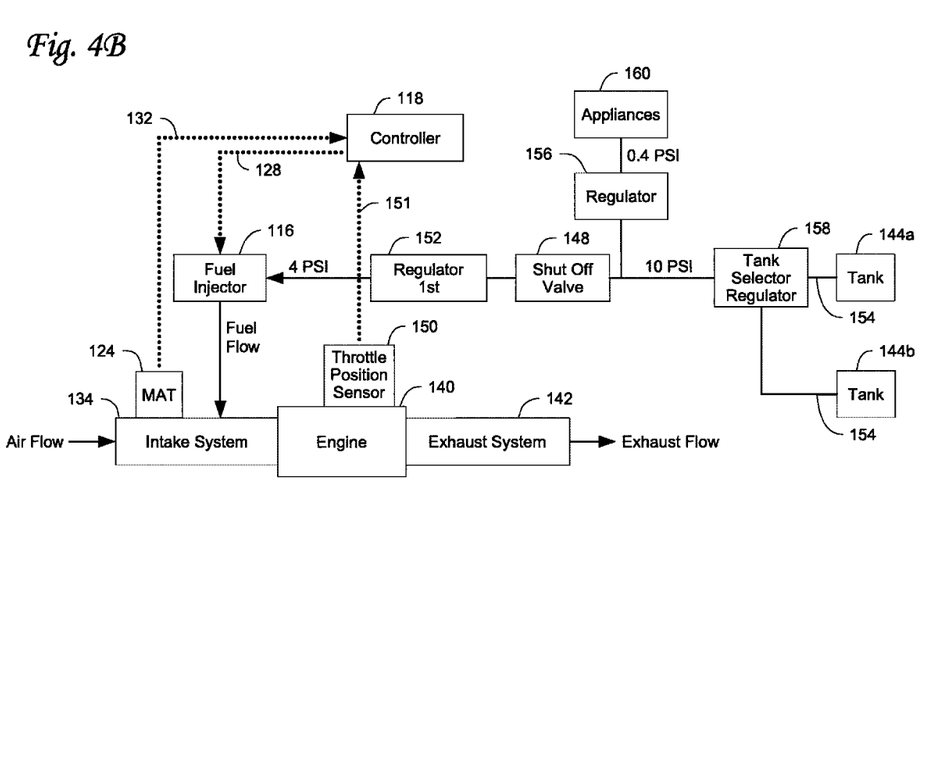
FIG. 4B illustrates a schematic of a genset engine that operates on an open loop EFI system incorporating a MAT sensor and throttle position sensor and runs on gaseous fuels.

In another embodiment, as shown in FIG. 4B, the open loop EFI system is comprised of a fuel injector 116, an electronic control unit (ECU) 118, a manifold air temperature (MAT) sensor 124, a throttle position sensor 150, communication circuitry 151 linking the ECU 118 and the throttle position sensor 150, communication circuitry 128 linking the ECU 118 and the fuel injector 116, and communication circuitry 132 linking the ECU 118 and the MAT sensor 124. Like reference numbers in FIGS. 4A and 4B are similar to those previously described.

It will be appreciated that the above embodiments are not all encompassing and there can be other sensors and combinations that may be employed.

The ECU 118 is the system computer and monitors engine operating parameters via various sensors. The ECU 118 contains look-up tables or algorithms used to determine the requested relative air-to-fuel ratio for acceptable engine performance. The stoichiometric AFR is a function of fuel composition and is the mass ratio of air to fuel in which there is not excess air or excess fuel after combustion. The ECU 118 uses the data from various other sensors and correlates this data with the data obtained from the air sensor(s) to determine the requested relative AFR ratio which is the ratio of the actual AFR to the stoichiometric AFR. The ECU 118 determines the requested relative AFR and sends a signal to the fuel injector 116 to open it at a specific time and for a specific length of time. To have the genset engine 140 start and operate at the requested relative AFR ratio in the calibration, the ECU 118 determines the amount of fuel that is needed and the ECU 118 actuates the fuel injector 116 to release fuel so that fuel can mix with the air flow to reach the requested relative AFR.

The fuel injector 116 is an electro-mechanical valve that provides metering of the fuel into the genset engine 140. The fuel injector 116 is normally closed, and opens to inject gaseous fuel for a specified length of time. For example, the fuel injector 116 forcibly pumps the fuel through a small nozzle under high pressure and the gaseous fuel is mixed with the air flow in the intake system 134 of the genset engine 140. In another embodiment, the gaseous fuel and air flow are mixed in the combustion area of the genset engine 140. The ECU 118 sends signals to the fuel injector 116 via communication circuitry 128.

When a MAP sensor is employed, the MAP sensor 122 is normally located in the intake manifold but it can also be mounted elsewhere on the engine, for example, in the air flow, usually after the throttle. The MAP sensor 122 senses changes in the intake manifold pressure resulting from engine load and speed changes. In some embodiments, the MAP sensor 122 can measure barometric pressure allowing adjustments for different altitudes. Information is transmitted instantaneously to the ECU 118 via communication circuitry 130. The data is used to calculate air flow and, in conjunction with the requested AFR, determine the required fuel metering at the fuel injector 116 for optimum combustion. In some embodiments, if a MAP sensor 122 is being used, a mass air flow sensor 120 may not be used or needed.

When a MAT sensor is employed, the MAT sensor 124 is normally located on the intake system 134. The MAT sensor 124 detects intake air temperature and transmits this information instantaneously to the ECU 118 via communication circuitry 132. The ECU 118 uses the information to make fine adjustments to the air/fuel mixture. The MAT sensor 124 is generally used in conjunction with the MAP sensor 122 to determine air flow.

When an air flow sensor 120 is employed, the air flow sensor 120 measures the air flow into the genset engine 140. Air flow is determined by either the mass airflow or the speed density. The airflow measurement is sent as data to the ECU 118 via communication circuitry 126. The air flow sensor 120 is disposed on the intake system 134 of the genset engine 140.

In the embodiments shown in FIGS. 3, 3A, 3B, 4, 4A, and 4B, the configurations can be useful for a genset engine 140 being started from a cold state. When the air flow sensor 120 is used, it senses the mass of air that flows past it and transmits this data to the ECU 118. It is to be realized that the air flow sensor 120 may not be provided if the MAP sensor 122 and/or MAT sensor 124 is provided. When one or both of the MAP sensor 122 and the MAT sensor 124 are used, the intake manifold pressure and the air temperature respectively are sensed and the data is transmitted to the ECU 118.

The ECU 118 determines the requested relative AFR ratio which is the ratio of the actual AFR to the stoichiometric AFR. The requested relative AFR is a value set in the look-up table that will provide acceptable genset engine 140 performance based on the given parameters. The requested relative AFR may be determined by using inputs from one or more other sensors or available information, such as for example, load current, engine speed, and/or oil temperature. These inputs are correlated with the data obtained from the air sensor(s) to determine the requested relative AFR. The ECU 118 electrically actuates the fuel injector 116 so that the gaseous fuel mixes with the air flow to reach the requested relative AFR. Therefore, to have the genset engine 140 start and operate at the requested relative AFR ratio in the calibration, the ECU 118 uses the individual air flow information and the requested relative AFR ratio to determine the amount of fuel that is needed and the ECU 118 actuates the fuel injector 116 such that gaseous fuel mixes with the air flow to reach the requested AFR. When the genset engine 140 is running, the sensors 120, 122, 124 continuously monitor and send data instantaneously to the ECU 118 so that real-time adjustments are made to the AFR and the genset engine 140 runs at an acceptable performance. Real-time adjustments are adjustments that are done almost instantly upon receiving input data. For example, a real-time adjustment would occur if the ECU 118 sensed a change in the air flow information during an engine cycle and then changed the fuel delivered to the engine in the very next cycle. An adjustment that takes several seconds, and several cycles, would not be adjusted in real-time. An example of this would be if a Fast Fourier Transform, which is a complicated algorithm, were being used in the ECU 118 on the input from a sensor to determine if the genset was running properly. This calculation takes several seconds, which is a relatively large amount of time compared to an engine cycle, and the calculation must complete before the ECU 118 can take action. Thus, the adjustment would not be in real-time.

The genset engine 140 described herein is capable of operating within performance and emission requirements while running on gaseous fuels, due to its ability to sense air flow and transmitting this data to the ECU 118 which subsequently controls the fueling to attain the correct AFR needed for acceptable performance. Therefore, an advantage is that the genset engine 140, with an open loop EFI system, will be able to run on gaseous fuel.

The examples and embodiments disclosed in this application are to be considered in all respects as illustrative and not imitative. The scope of the invention is indicated by the appended claims rather than by the foregoing description; and all changes which come within the meaning and range of equivalency of the claims are intended to be embraced therein.

The invention claimed is:

1. A genset assembly integrated with an open loop electronic fuel injection system, comprising:
   a genset assembly that includes
      an engine that runs on gaseous fuel that is liquid petroleum gas,
      a generator that is driven by the engine, and
      an intake system that receives air and is in fluid communication with the engine; and
   an open loop electronic fuel injection system that includes
      a fuel injector that injects the fuel into the intake system so as to form an air/fuel mixture;
      an electronic control unit;
      an air sensor that is at least one selected from the group consisting of an air flow sensor, a manifold air temperature sensor and a manifold absolute pressure sensor; and
      a gaseous fuel regulator connected via a fuel line to the fuel injector;
   the genset assembly and the open loop electronic fuel injection system being integrated such that the electronic control unit and the fuel injector are linked via a first communication circuitry and the electronic control unit and the air sensor are linked via a second communication circuitry,
   wherein data from the air sensor is transmitted to the electronic control unit via the second communication circuitry,
   wherein the electronic control unit is configured to determine a requested relative air to fuel ratio based on a data correlation of data from the air sensor against data in a lookup table of the electronic control unit, the requested relative air to fuel ratio being a ratio of the actual air to fuel ratio to a stoichiometric air to fuel ratio, and based on the determined requested relative air to fuel ratio, the electronic control unit is configured to actuate the fuel injector via the first communication circuitry such that the gaseous fuel in an amount sufficient for obtaining an air/fuel mixture that is at the determined requested relative air to fuel ratio is injected into the intake system,
   wherein the engine provided with the air/fuel mixture that is at the determined requested relative air to fuel ratio is capable of starting and operating from a cold state,
   wherein the engine runs rich of stoichiometry, and
   wherein the open loop electronic fuel injection system is configured to operate with the gaseous fuel.

2. The genset assembly integrated with an open loop electronic fuel injection system of claim 1, wherein the air sensor includes the air flow sensor and data from the air flow sensor is transmitted to the electronic control unit via air flow sensor communication circuitry.

3. The genset assembly integrated with an open loop electronic fuel injection system of claim 1, wherein the air sensor includes the manifold absolute pressure sensor and data from the manifold absolute pressure sensor is transmitted to the electronic control unit via manifold absolute pressure sensor communication circuitry.

4. The genset assembly integrated with an open loop electronic fuel injection system of claim 1, further comprising:
   a throttle position sensor;
   and the air sensor includes the manifold air temperature sensor;

wherein data from the manifold air temperature sensor is transmitted to the electronic control unit via manifold air temperature communication circuitry; and data from the throttle position sensor is transmitted to the electronic control unit via throttle position sensor communication circuitry.

5. The genset assembly integrated with an open loop electronic fuel injection system of claim 1, wherein the air sensor includes the manifold absolute pressure sensor, and the manifold air temperature sensor, and data from the manifold absolute pressure sensor is transmitted to the electronic control unit via manifold absolute pressure sensor communication circuitry, and data from the manifold air temperature sensor is transmitted to the electronic control unit via manifold air temperature communication circuitry.

6. The genset assembly integrated with an open loop electronic fuel injection system of claim 1, wherein the gaseous fuel is liquefied propane gas.

7. The genset assembly integrated with an open loop electronic fuel injection system of claim 1, comprising two or more fuel tanks, wherein each tank is operatively connected to the gaseous fuel regulator via a tank selector regulator common to the fuel tanks.

8. The genset assembly integrated with an open loop electronic fuel injection system of claim 1, wherein the gaseous fuel and air are mixed in the intake system of the engine or mixed in a combustion area of the engine.

9. The genset assembly integrated with an open loop electronic fuel injection system of claim 1, wherein the genset engine is provided in a recreational vehicle.

10. The genset assembly integrated with an open loop electronic fuel injection system of claim 1, wherein the genset engine is a stand-alone engine.

11. The genset assembly integrated with an open loop electronic fuel injection system of claim 1, wherein the gaseous fuel regulator maintains a first gaseous pressure.

12. The genset assembly integrated with an open loop electronic fuel injection system of claim 11, further comprising another gaseous fuel regulator provided upstream from the gaseous fuel regulator, wherein the another gaseous fuel regulator maintains a second gaseous fuel pressure.

13. The genset assembly integrated with an open loop electronic fuel injection system of claim 12, wherein the another gaseous fuel regulator is a tank selector regulator or a two-stage gaseous fuel regulator.

14. The genset assembly integrated with an open loop electronic fuel injection system of claim 12, further comprising a shut-off valve between the gaseous fuel regulator and the another gaseous fuel regulator.

15. The genset assembly integrated with an open loop electronic fuel injection system of claim 1, further comprising a two-stage gaseous fuel regulator configured to deliver gaseous fuel to gaseous fuel consuming appliances.

16. The genset assembly integrated with an open loop electronic fuel injection system of claim 15, wherein the two-stage gaseous fuel regulator maintains a first gaseous fuel pressure on one outlet and a second gaseous fuel pressure on the another outlet.

17. A method for controlling air-to-fuel ratio in a genset assembly operating on gaseous fuels comprising:

integrating a genset assembly with an open loop electronic fuel injection system, the genset assembly including an engine that runs on gaseous fuel that is liquified petroleum gas, a generator that is driven by the engine, and an intake system that receives air and is in fluid communication with the engine; the open loop electronic fuel injection system including a fuel injector that injects fuel into the intake system so as to form an air/fuel mixture within the intake air system, an electronic control unit, an air sensor that is at least one selected from the group consisting of an air flow sensor a manifold air temperature sensor and a manifold absolute pressure sensor, and a gaseous fuel regulator connected via a fuel line to the fuel injector, the genset assembly and fuel injection system being integrated such that the electronic control unit and the fuel injector are linked via a first communication circuitry, and the electronic control unit and the air sensor are linked via a second communication circuitry;

transmitting data from the air sensor to the electronic control unit via the second communication circuitry;

determining a requested relative air to fuel ratio by correlating the data transmitted from the air sensor to the electronic control unit with data provided in a lookup table of the electronic control unit, the requested relative air to fuel ratio being a ratio of the actual air to fuel ratio to a stoichiometric air to fuel ratio; and actuating the fuel injector based on the requested relative air to fuel ratio such that the gaseous fuel in an amount sufficient for obtaining an air/fuel mixture that is at the determined requested relative air to fuel ratio is injected into the intake system the engine provided with the air/fuel mixture that is at the determined requested relative air to fuel ratio being capable of starting and operating from a cold state, the fuel injector being actuated via the first communication circuitry, wherein the engine runs rich of stoichiometry.

* * * * *